US012650786B2

(12) United States Patent
Creanga et al.

(10) Patent No.: US 12,650,786 B2
(45) Date of Patent: Jun. 9, 2026

(54) SYSTEMS AND METHODS FOR PROCESS EXECUTION

(71) Applicant: Kinaxis Inc., Ottawa (CA)

(72) Inventors: Marin Creanga, Ottawa (CA); Dylan Ellicott, Ottawa (CA); Tahira Ghani, Ottawa (CA); Matthew Manouchehri-Penner, Winchester (CA); Lauris Petlah, Richmond Hill (CA); Peter Thomsen, Surrey (CA); Chao Zhao, Ottawa (CA)

(73) Assignee: Kinaxis Inc., Ottawa (CA)

( * ) Notice: Subject to any disclaimer, the term of this patent is extended or adjusted under 35 U.S.C. 154(b) by 0 days.

(21) Appl. No.: 18/982,549

(22) Filed: Dec. 16, 2024

(65) Prior Publication Data

US 2025/0199714 A1      Jun. 19, 2025

Related U.S. Application Data

(60) Provisional application No. 63/610,768, filed on Dec. 15, 2023.

(51) Int. Cl.
*G06F 3/00* (2006.01)
*G06F 3/06* (2006.01)
(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS

| | | | | |
|---|---|---|---|---|
| 6,148,296 A | * | 11/2000 | Tabbara | ............... G06F 16/2452 |
| 10,061,613 B1 | * | 8/2018 | Brooker | ............... G06F 9/5005 |
| 10,613,897 B1 | * | 4/2020 | Wang | .................... G06F 9/4843 |

* cited by examiner

*Primary Examiner* — Craig S Goldschmidt
(74) *Attorney, Agent, or Firm* — Ruggiero McAllister & McMahon LLC

(57) ABSTRACT

Systems and methods disclose herein procedures for accelerated tree learning. In one class, the acceleration is based on self-adapting learning rates, while in another class, the acceleration is based on a plurality of learning rates, wherein each learning rate varies over the training; each learning rate increases linearly as a respective pseudo residual maintains a direction across sequential training iterations; and each learning rate decreases exponentially as the respective pseudo residual changes direction across sequential training iterations. The latter can be incorporated with other methodologies, such as momentum-augmented gradient boosting and Nesterov Accelerated Gradient Boosting. These systems and methods for accelerated tree learning exhibit a marked reduction in training time and resources required for gradient boosted trees.

18 Claims, 6 Drawing Sheets

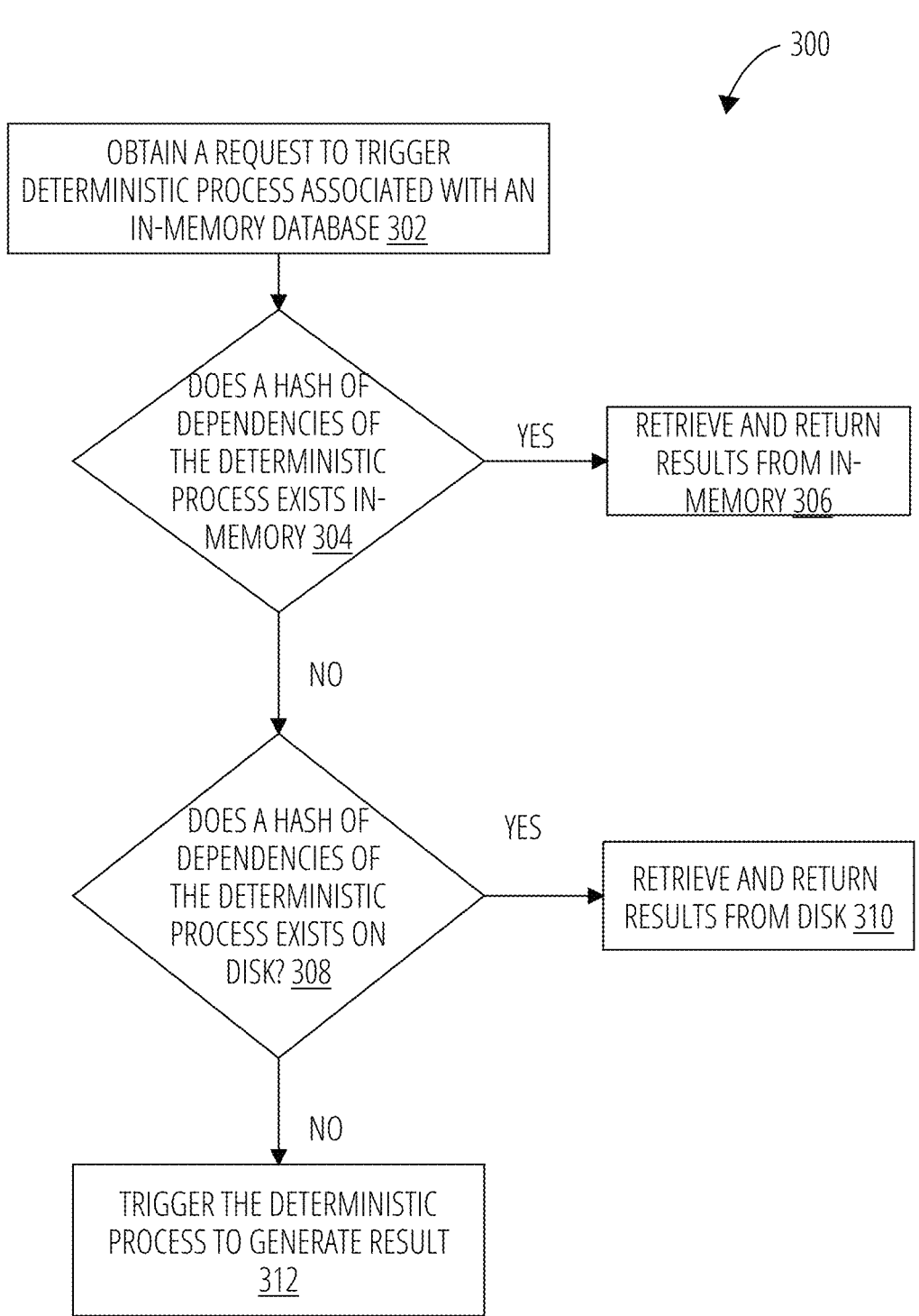

300

OBTAIN A REQUEST TO TRIGGER DETERMINISTIC PROCESS ASSOCIATED WITH AN IN-MEMORY DATABASE 302

DOES A HASH OF DEPENDENCIES OF THE DETERMINISTIC PROCESS EXISTS IN-MEMORY 304

YES

RETRIEVE AND RETURN RESULTS FROM IN-MEMORY 306

NO

DOES A HASH OF DEPENDENCIES OF THE DETERMINISTIC PROCESS EXISTS ON DISK? 308

YES

RETRIEVE AND RETURN RESULTS FROM DISK 310

NO

TRIGGER THE DETERMINISTIC PROCESS TO GENERATE RESULT 312

OBTAIN A RESULT OF A
DETERMINISTIC PROCESS
ASSOCIATED WITH AN IN-MEMORY
DATABASE STORED IN A RAM 602

OBTAIN A CHARACTERISTIC OF THE
DETERMINISTIC PROCESS 604

DETERMINE A STORAGE LOCATION
ASSOCIATED WITH STORING THE
RESULT EITHER IN-MEMORY OR
ON-DISK 606

STORE THE RESULT IN THE
DETERMINED STORAGE LOCATION.
608

END 610

SYSTEMS AND METHODS FOR PROCESS EXECUTION

CROSS-REFERENCE TO RELATED APPLICATIONS

The present application claims priority to U.S. Provisional Patent Application No. 63/510,768, filed Dec. 15, 2023, the entirety of which is hereby incorporated by reference.

BACKGROUND

Databases may be used for a variety of functions, with different types of databases used for different functions. For example, a versioned in-memory database may have numerous fields and tables that are calculated by various processes or algorithms. On access of these fields or tables, the database may trigger an appropriate algorithm, gather the results, store the results in-memory in the respective version, and finally return the result to the caller.

Storing the results in-memory allows the database to avoid unnecessary calculations by reusing the results from a previous calculation. To maintain consistency, the database may have rules based on process or algorithm dependencies to invalidate these in-memory caches based on data changes.

Such a known approach works well if there is sufficient memory to accommodate algorithm results. If the amount of memory required to calculate all algorithms across all versions is too small, then the server has the challenge of evicting certain results to make room for newer results

BRIEF SUMMARY

The details of one or more embodiments of the subject matter of this specification are set forth in the accompanying drawings and the description below. Other features, aspects, and advantages of the subject matter may become apparent from the description, the drawings, and the claims.

In one aspect, a computer-implemented method of process execution, includes obtaining, by a processor, a request to trigger a deterministic process associated with an in-memory database stored in a random access memory (RAM). The computer-implemented method also includes determining whether a result associated with the deterministic process exists in-memory. The computer-implemented method also includes in response to a determination that the result does not exist in-memory gathering dependencies of the deterministic process, hashing the gathered dependencies of the deterministic process, determining whether the hash exists on a disk associated with the in-memory database, if the hash exists on the disk, retrieving the results from disk, and if the hash does not exist on the disk, triggering the deterministic process to generate results.

In one aspect, a computing apparatus includes a processor. The computing apparatus also includes a memory storing instructions that, when executed by the processor, configure the apparatus to obtain, by a processor, a request to trigger a deterministic process associated with an in-memory database stored in a random access memory (RAM). The computing apparatus also includes a memory storing instructions that, when executed by the processor, configure the apparatus to determine whether a result associated with the deterministic process exists in-memory. The computing apparatus also includes a memory storing instructions that, when executed by the processor, configure the apparatus to, in response to a determination that the result does not exist in-memory: gather dependencies of the deterministic process; hash the gathered dependencies of the deterministic process; determine whether the hash exists on a disk associated with the in-memory database; if the hash exists on the disk, retrieve the results from disk; and if the hash does not exist on the disk, trigger the deterministic process to generate results.

In one aspect, a non-transitory computer-readable storage medium is provided. The computer-readable storage medium includes instructions that when executed by a computer, cause the computer to obtain, by a processor, a request to trigger a deterministic process associated with an in-memory database stored in a random access memory (RAM). The non-transitory computer-readable storage medium also includes instructions that when executed by a computer, cause the computer to determine whether a result associated with the deterministic process exists in-memory. The non-transitory computer-readable storage medium also includes instructions that when executed by a computer, cause the computer to, in response to a determination that the result does not exist in-memory: gather dependencies of the deterministic process; hash the gathered dependencies of the deterministic process; determine whether the hash exists on a disk associated with the in-memory database; if the hash exists on the disk, retrieve the results from disk; and if the hash does not exist on the disk, trigger the deterministic process to generate results.

In one aspect, a computer-implemented method of process execution includes: obtaining, by a processor, a request to trigger a deterministic process associated with an in-memory database; determining whether a hash of dependencies of the deterministic process exists in-memory; if the hash exists on disk, retrieving the results from disk; and if the hash does not exist on disk, triggering the deterministic process to generate results.

In one aspect, a computer-implemented method of process execution includes obtaining, by a processor, a request to trigger a deterministic process associated with an in-memory database. The computer-implemented method also includes, in response to a determination that a result associated with the deterministic process does not exist in-memory: gathering dependencies of the deterministic process; hashing the gathered dependencies of the deterministic process; determining whether the hash exists on disk; if the hash exists on disk, retrieving the results from disk; and if the hash does not exist on disk, triggering the deterministic process to generate results.

In one aspect, a computer-implemented method of obtaining results of a deterministic process includes obtaining, by a processor, a request to obtain a result of a deterministic process associated with an in-memory database stored in a random access memory (RAM). The computer-implemented method also includes: determining whether the result exists in-memory; in response to determining that the result exists in-memory, retrieving and returning the result. The computer-implemented method also includes, in response to determining that the result does not exist in-memory: gathering dependencies of the deterministic process; hashing the gathered dependencies of the deterministic process; determining whether the hash exists on a disk associated with the in-memory database; if the hash exists on the disk, retrieving the result from the disk and returning the result; and if the hash does not exist on the disk, triggering the deterministic process to generate the result, and storing the result in-memory and/or on-disk.

In one aspect, a computer-implemented method of obtaining results of a deterministic process includes: obtaining, by a processor, a result of a deterministic process associated with an in-memory database stored in a random access memory (RAM); obtaining a characteristic of the deterministic process; determining, based on the obtained characteristic of the deterministic process, a storage location associated with storing the result either in-memory or on-disk; and storing the result in the determined storage location. The computer-implemented method may also include determining the storage location as being on-disk when the deterministic process is an embedded algorithm, such as a Type-Script algorithm.

The details of one or more embodiments of the subject matter of this specification are set forth in the accompanying drawings and the description below. Other features, aspects, and advantages of the subject matter may become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 illustrates a block diagram of a method of process execution in accordance with one embodiment.

DETAILED DESCRIPTION

Figure 1:
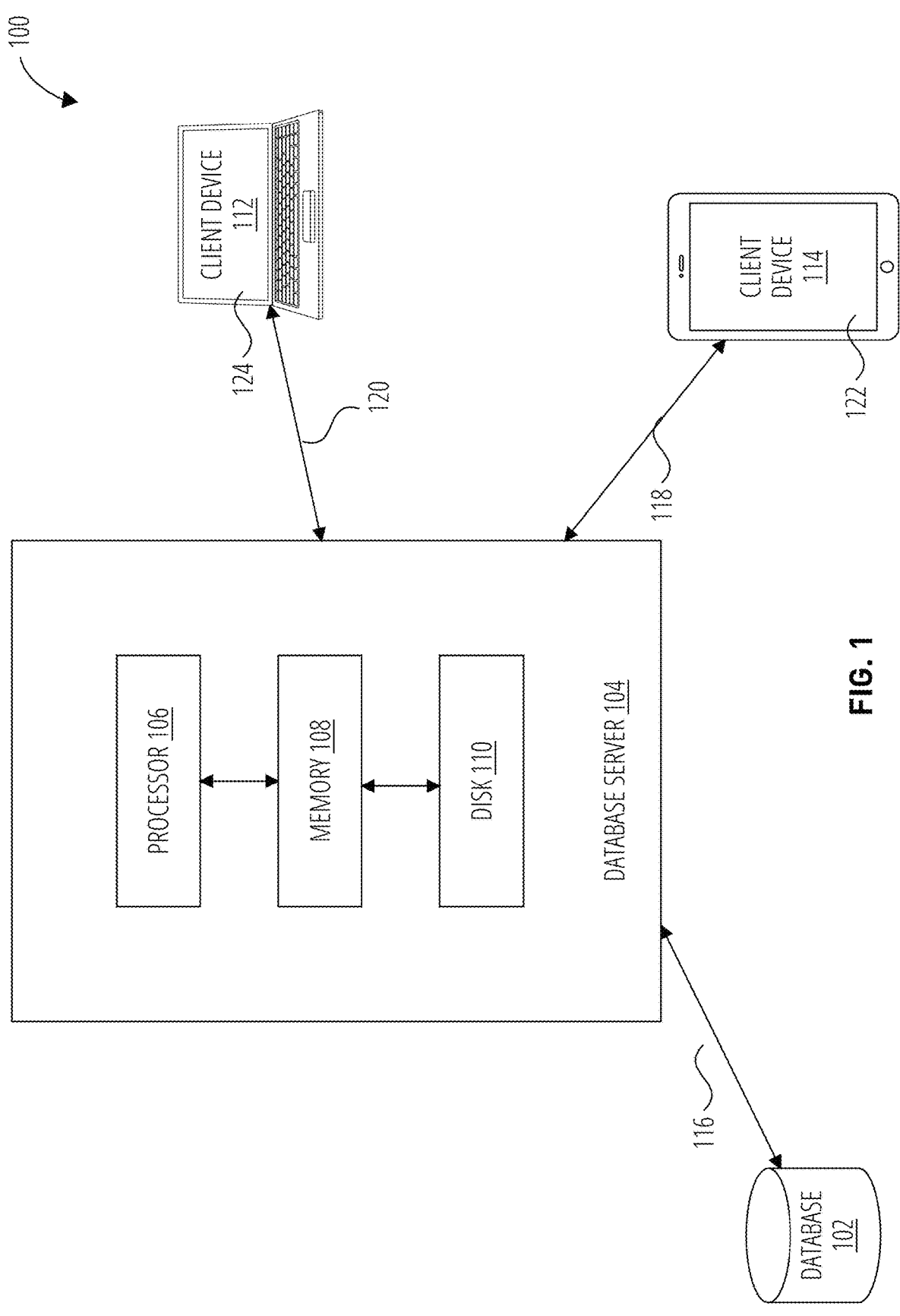
FIG. 1 illustrates an example of a system for process execution, such as tiered algorithm caching, in accordance with one embodiment.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium can include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a standalone program, a component, or other unit suitable for use in a computing environment. A computer program can be deployed to be executed on one computer or can be deployed on multiple computers that are located at one site or distributed across multiple sites and interconnected by a communication network.

As used herein, a "software engine" or an "engine," refers to a software implemented system that provides an output that is different from the input. An engine can be an encoded block of functionality, such as a platform, a library, an object or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows that can be performed by an apparatus, can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (for example, a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

FIG. 1 illustrates an example of a system 100 for process execution, such as tiered algorithm caching, in accordance with one embodiment.

System 100 includes a database server 104, a database 102, and client devices 112 and 114. Database server 104 can include a memory 108, a disk 110, and one or more processors 106. In some embodiments, memory 108 can be volatile memory, compared with disk 110 which can be non-volatile memory. In some embodiments, database server 104 can communicate with database 102 using interface 116. Database 102 can be a versioned database or a database that does not support versioning. While database 102 is illustrated as separate from database server 104, database 102 can also be integrated into database server 104, either as a separate component within database server 104, or as part of at least one of memory 108 and disk 110. A versioned database can refer to a database which provides numerous complete delta-based copies of an entire database. Each complete database copy represents a version. Versioned databases can be used for numerous purposes, including simulation and collaborative decision-making.

System 100 can also include additional features and/or functionality. For example, system 100 can also include additional storage (removable and/or non-removable) including, but not limited to, magnetic or optical disks or tape. Such additional storage is illustrated in FIG. 1 by memory 108 and disk 110. Storage media can include volatile and nonvolatile, removable and non-removable media implemented in any method or technology for storage of information such as computer-readable instructions, data structures, program modules or other data. Memory 108 and disk 110 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 100. Any such non-transitory computer-readable storage media can be part of system 100.

System 100 can also include interfaces 116, 118 and 120. Interfaces 116, 118 and 120 can allow components of system 100 to communicate with each other and with other devices. For example, database server 104 can communicate with database 102 using interface 116. Database server 104 can also communicate with client devices 112 and 114 via interfaces 120 and 118, respectively. Client devices 112 and 114 can be different types of client devices; for example, client device 112 can be a desktop or laptop, whereas client device 114 can be a mobile device such as a smartphone or tablet with a smaller display. Non-limiting example interfaces 116, 118 and 120 can include wired communication links such as a wired network or direct-wired connection, and wireless communication links such as cellular, radio frequency (RF), infrared and/or other wireless communication links. Interfaces 116, 118 and 120 can allow database server 104 to communicate with client devices 112 and 114 over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB).

The various network types to which interfaces 116, 118 and 120 can connect can run a plurality of network protocols including, but not limited to Transmission Control Protocol (TCP), Internet Protocol (IP), real-time transport protocol (RTP), realtime transport control protocol (RTCP), file transfer protocol (FTP), and hypertext transfer protocol (HTTP).

Using interface 116, database server 104 can retrieve data from database 102. The retrieved data can be saved in disk 110 or memory 108. In some cases, database server 104 can also comprise a web server, and can format resources into a format suitable to be displayed on a web browser. Database server 104 can then send requested data to client devices 112 and 114 via interfaces 120 and 118, respectively, to be displayed on applications 122 and 124. Applications 122 and 124 can be a web browser or other application running on client devices 112 and 114.

In the present disclosure, the terms "process" and "algorithm" are used interchangeably, and may refer to a set of steps performed in relation to an in-memory database, such as a versioned database. As referred to herein, for example, a deterministic process may be considered to be equivalent to a deterministic algorithm. A deterministic algorithm always produces the same output given a particular input. For example, an algorithm that always returns an output of Y with an input of X is deterministic. So, every time there is an input of X, it is known that the answer is Y. The result does not have to be unique, for example an input of Q can also return an output of Y, just deterministic. For a deterministic algorithm, once the input is known, the answer or output is already known, and it is not necessary to send the input to the algorithm at all.

In some implementations, a server memory may store an in-memory database as well as calculated results from processes or algorithms that are executed in relation to contents of the in-memory database. In some implementations, the calculated results may comprise about half of the server memory.

Reference to "in-memory" storage may refer to a server memory associated with database server 104, which may comprise memory 108 and/or database 102. Reference to "on-disk" storage may refer to disk 110 and/or other disks, for example disks associated with cloud storage.

In known approaches, both data (e.g. a versioned database) and calculations (e.g. calculated results) are stored in-memory. Such an approach is fast but also expensive. There is also a drawback that calculated results stored in-memory do not persist to disk when the server is restarted. The first time a calculation is performed, not only do all of the records need to be in-memory, but also the calculation structures must be built up in memory.

Embodiments of the present disclosure save memory and improve performance. Embodiments of the present disclosure avoid the time required to re-calculate the results, even the first time after server startup. Servers may have complicated invalidation rules. Even if something is stored in-memory, if the database changes, the results may be incorrect. Analytics results may also be lost from memory if the server detects that it is running out of memory. Embodiments of the present disclosure seek to solve one or more problems associated with known approaches, including wasted time and resources spent recalculating results.

A deterministic process as referred to herein may comprise an embedded algorithm, such as a supply chain algorithm used to analyze or calculate results based on an in-memory versioned database. An embedded algorithm may be implemented as a TypeScript algorithm. A deterministic process may comprise a core algorithm the results of which may not be serializable, for example if they are in-memory C++ objects that refer to other memories and other pointers.

Embodiments of the present disclosure may establish two tiers of storage, where the system may promote or demote a result. According to known approaches, some databases only exist in-memory, or only on-disk. Embodiments of the present disclosure provide a method of demoting content from in-memory to on-disk, or promoting content from on-disk to in-memory, for example in response to a server command or indication. If a result is not previously calculated, it can go from nowhere to in-memory or on-disk. In-memory is typically one tier, but on-disk can be one or more tiers. Embodiments of the present disclosure may be configured to provide an n-tier solution, for example where cloud storage provides different types of disks with different speeds of access, and the system may promote/demote to faster or slower disks in different on-disk tiers. Promoting/demoting refers to moving the results around, and is with respect to speed of access to the memory or disk(s).

Embodiments of the present disclosure comprise an end-to-end method of obtaining, hashing and persisting results from a deterministic process. Details of this end-to-end process are outlined in relation to FIG. 2.

Figure 2:
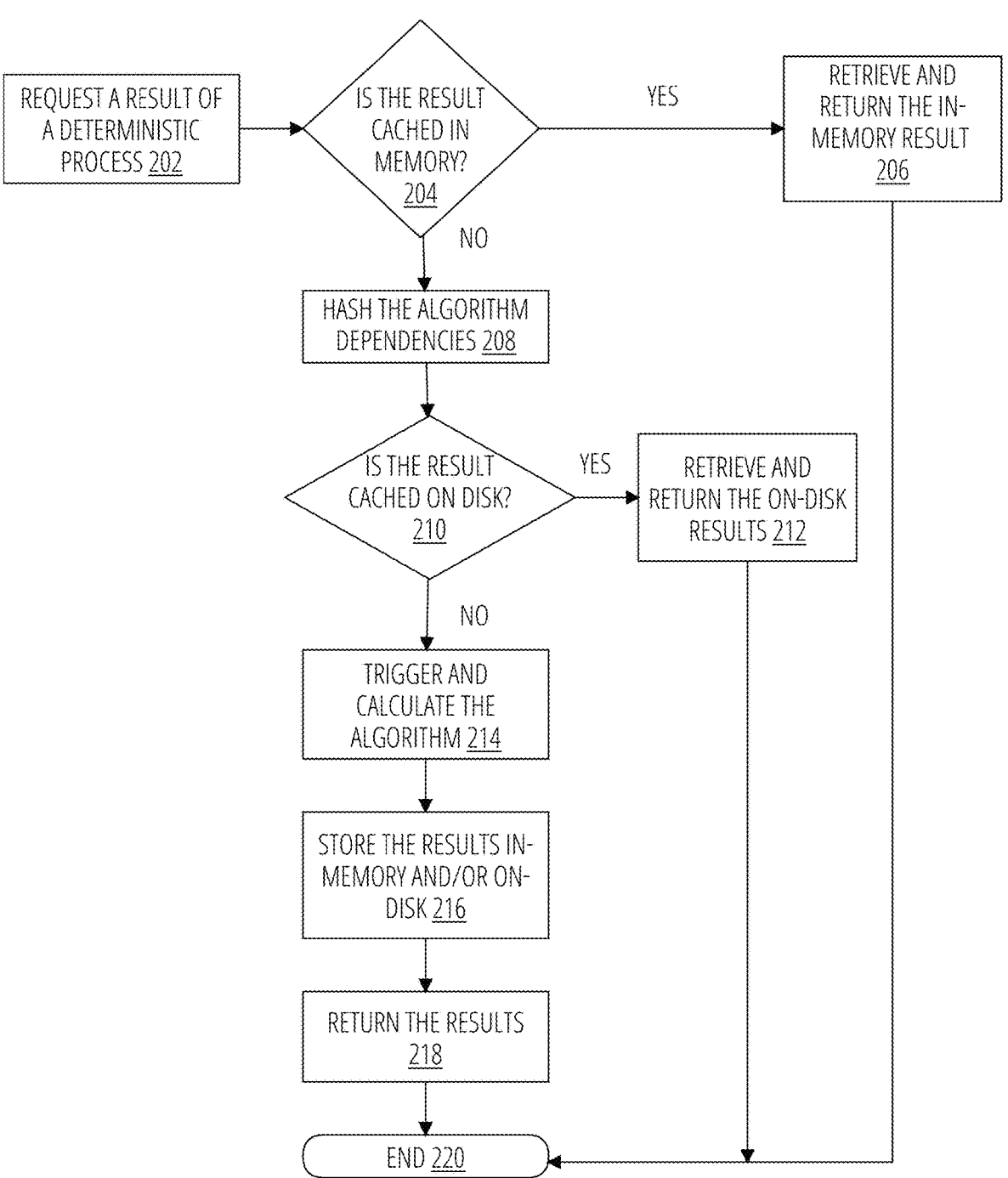
FIG. 2 is a flowchart illustrating a method of process execution, such as tiered algorithm caching, in accordance with one embodiment.

FIG. 2 illustrates an example routine or method for process execution, such as tiered algorithm caching, in accordance with one embodiment. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes requesting a result of a deterministic process at request step 202 For example, the processor 106 illustrated in FIG. 1 may request a result of a deterministic process. The deterministic process can be associated with an in-memory database comprising integrated analytics. The result of the deterministic process may be provided based on the process or algorithm itself, as well as its dependencies.

According to some examples, the method includes determining whether the result is cached in-memory, such as at result in memory step decision block 204. For example, the processor 106 illustrated in FIG. 1 may determine whether the result cached in-memory.

According to some examples, in response to determining that the result is cached in-memory ('yes' at decision block 204), the method includes retrieving and returning the in-memory result at in-memory retrieval step 206. For example, the processor 106 illustrated in FIG. 1 may retrieve and return the in-memory result.

According to some examples, if the result is not cached in-memory ('no' at decision block 204), the method includes hashing the process or algorithm dependencies at hashing step block 208. For example, the method may comprise hashing the dependencies, regardless of the size of the data required for the dependencies, into a 20-byte hash. The 20-byte hash may be used as an identifier for the algorithm and/or its dependencies. For example, the processor 106 illustrated in FIG. 1 may hash the algorithm dependencies. In an example embodiment, algorithm dependencies comprise data that the algorithm needs. For example, if an algorithm requires Table A and Table C as inputs, then the dependencies of that algorithm are Table A and Table C.

According to some examples, after hashing the process or algorithm dependencies, the method determines whether the result is cached on-disk, for example at decision block 210. For example, the processor 106 illustrated in FIG. 1 may be configured to determine whether the result is cached on-disk.

According to some examples, in response to determining that the result is cached on-disk ('yes' at decision block 210), the method includes retrieving and returning the on-disk results at on-disk retrieval step 212. For example, the processor 106 illustrated in FIG. 1 may retrieve and return the on-disk results.

According to some examples, in response to determining that the result is not cached on-disk ('no' at decision block 210), the method includes triggering and calculating the algorithm at algorithm calculation step 214. For example, the processor 106 illustrated in FIG. 1 may trigger and calculate the algorithm, or the deterministic process. To trigger the process or algorithm, a server may send the data required by the algorithm's dependencies, and the algorithm will run and produce the result. After obtaining the result, the method will have produced two helpful pieces of information: the result and the hash. Based on knowing the hash and knowing the result of the deterministic process, the input to the deterministic process may be determined.

According to some examples, after algorithm calculation step 214, the method includes storing the results in-memory and/or on-disk at result storage step 216. For example, the processor 106 illustrated in FIG. 1 may store the results in-memory and/or on-disk, such as based on stored rules or other parameters. Upon receipt of a request for a result of a deterministic process, the method may include assigning the result and/or the hash associated with the result to an upper tier of storage, for example in-memory. In another example embodiment, only the hash is stored in an upper tier in-memory, and the result is stored in a lower tier on-disk.

The server may be able to store some algorithm results in memory to avoid unnecessary computations while others can be stored on disk. The distinction between storing in-memory or on-disk may be made based on performance requirements, and/or available memory. In-memory results offer maximum performance and high memory usage. On-disk results offer good performance and low memory usage.

According to an example implementation, the method may comprise pre-computing all deterministic processes, or algorithms, in the system and storing the results in a lower tier of storage. Pre-computing all deterministic processes may be performed pre-emptively by a database server, such as database server 104. Such an approach provides an improved user experience, with improved user perceived performance, since the user avoids doing a real calculation, and can simply provide a hash identifier and obtain the pre-computed result stored on disk, without spending any CPU resources computing the algorithm itself. In most cases, it is simpler to retrieve a result from a lower tiered cache than to do the real computation.

According to some examples, the method includes returning the results at result return step 218. For example, the processor 106 illustrated in FIG. 1 may return the results. Returning the results may be to a server or to a client device.

According to some examples, the method includes ending at End step 220. The method concludes at 220, either after result return step 218, on-disk retrieval step 212, or in-memory retrieval step 206.

Embodiments of the present disclosure overcome limitations of known approaches by storing some calculated results on disk instead of in-memory.

In an example implementation, there are two characteristics that a process or an algorithm needs to meet to use a method according to an embodiment of the present disclosure: the algorithm dependencies are known up front; and the algorithm is deterministic. If these two characteristics are satisfied, embodiments of the present disclosure may store results on disk using the following steps:

Step 1) Gather the dependencies of the algorithms:
  1A) Gathering the dependencies may comprise obtaining an indication of the dependencies (e.g. the algorithm is dependent on Table A and Table C), as well as obtaining the data required for the dependencies (e.g. obtaining Table A and Table C)
  1B) Gathering the dependencies may comprise sending the dependencies over a network to a different machine.
Step 2) Hash the dependencies;
For example, the system may hash the dependencies, regardless of the size of the data required for the dependencies, into a 20 byte hash. The 20 byte hash may be used as an identifier for that data.
Step 3) Calculate the algorithm and get the result
Step 4) Store the result on disk with the hash as the identifier According to an example embodiment, a method may comprise or a subroutine that iterates the entire database and pre-computes all algorithms across all versions and stores the results to disk. Such an approach means that when a user device accesses any calculated field or calculated tables, the user device will not incur the cost of triggering the algorithm. Instead, the results are retrieved from disk, since the algorithm or process is deterministic.

The on-disk storage allows a server to inexpensively store vast amount of algorithm results. With this technique in place, embodiments of the present disclosure provide the following technical advantages:

Persist results across database restarts (Improved user perceived performance)
Pre-compute algorithms (Improved user perceived performance)
Use less memory (Decrease server memory usage)
When the server is configured to trigger an algorithm, the server may perform the following steps:

Step 1) Check if the results exist in-memory, if so, return results, else continue
Step 2) Gather the dependencies of the algorithm
Step 3) Hash the dependencies
Step 4) Check if hash exists on disk
Step 5) If hash exists on disk retrieve, the results from disk
Step 6) If hash doesn't exist on disk, trigger algorithm to calculate results Embodiments of the present disclosure use less in-memory storage, for example server memory. In an embodiment, only hashes (which may only be 20 bytes) are kept in-memory, and the results (which may be much larger) are stored on-disk. In an embodiment, in-memory is a physical RAM (random access memory) that is part of, or associated with, a database server, and on-disk is another type of storage that is not in-memory.

In an example embodiment, if a command is received to delete in-memory results, for example based on the system reaching a low available memory, the system is instead configured to demote the in-memory results to be stored on-disk, rather than simply deleting them from in-memory.

In example embodiment, the system may be configured to store results in-memory based on characteristics of a triggered deterministic process or algorithm. For example, based on measured performance results associated with a deterministic process "X", the system may identify deterministic process "X" as running better with a cache completely disabled, and may be configured to only store the results of deterministic process "X" in tier 1 or tier 2 storage.

In another example embodiment, based on a measured in-memory capacity of a database server, the system may be configured to always store analytics results, which are more expensive in terms of computation, in tier 2 storage and disable tier 1 storage for those analytics results. One or more tier storage rules may be defined and stored with respect to a particular server and storage configuration and/or with respect to individual deterministic processes or algorithms.

FIG. 3 illustrates a block diagram 300 of a method of process execution in accordance with one embodiment.

According to some examples, the method includes obtaining a request to trigger a deterministic process associated with an in-memory database at step 302 For example, the processor 106 illustrated in FIG. 1 may obtain a request to trigger deterministic process associated with an in-memory database. The deterministic process can be associated with an in-memory database comprising integrated analytics. The result of the deterministic process may be provided based on the process or algorithm itself, as well as its dependencies.

According to some examples, the method includes determining whether a hash of dependencies of the deterministic process exists in-memory, such as at decision block 304. For example, the processor 106 illustrated in FIG. 1 may determine whether the result exists in-memory.

According to some examples, in response to determining that the result is cached in-memory ('yes' at decision block 304), the method includes retrieving and returning the in-memory result at in-memory retrieval step 306. For example, the processor 106 illustrated in FIG. 1 may retrieve and return the in-memory result.

According to some examples, if the result is not cached in-memory ('no' at decision block 304), the method includes determining whether the a hash of dependencies of the deterministic process exists on disk, such as at decision block 308. For example, the processor 106 illustrated in FIG. 1 may determine whether the hash of dependencies of the deterministic process exists on disk.

According to some examples, in response to determining that the hash of dependencies of the deterministic process exists on disk ('yes' at decision block 308), the method includes retrieving and returning the on-disk result at in-memory retrieval step 310. For example, the processor 106 illustrated in FIG. 1 may retrieve and return the on-disk result.

According to some examples, in response to determining that the hash of dependencies of the deterministic process does not exist on disk ('no' at decision block 308), the method includes triggering the deterministic process to generate results at block 312. For example, the processor 106 illustrated in FIG. 1 may trigger. the deterministic process.

Figure 4:
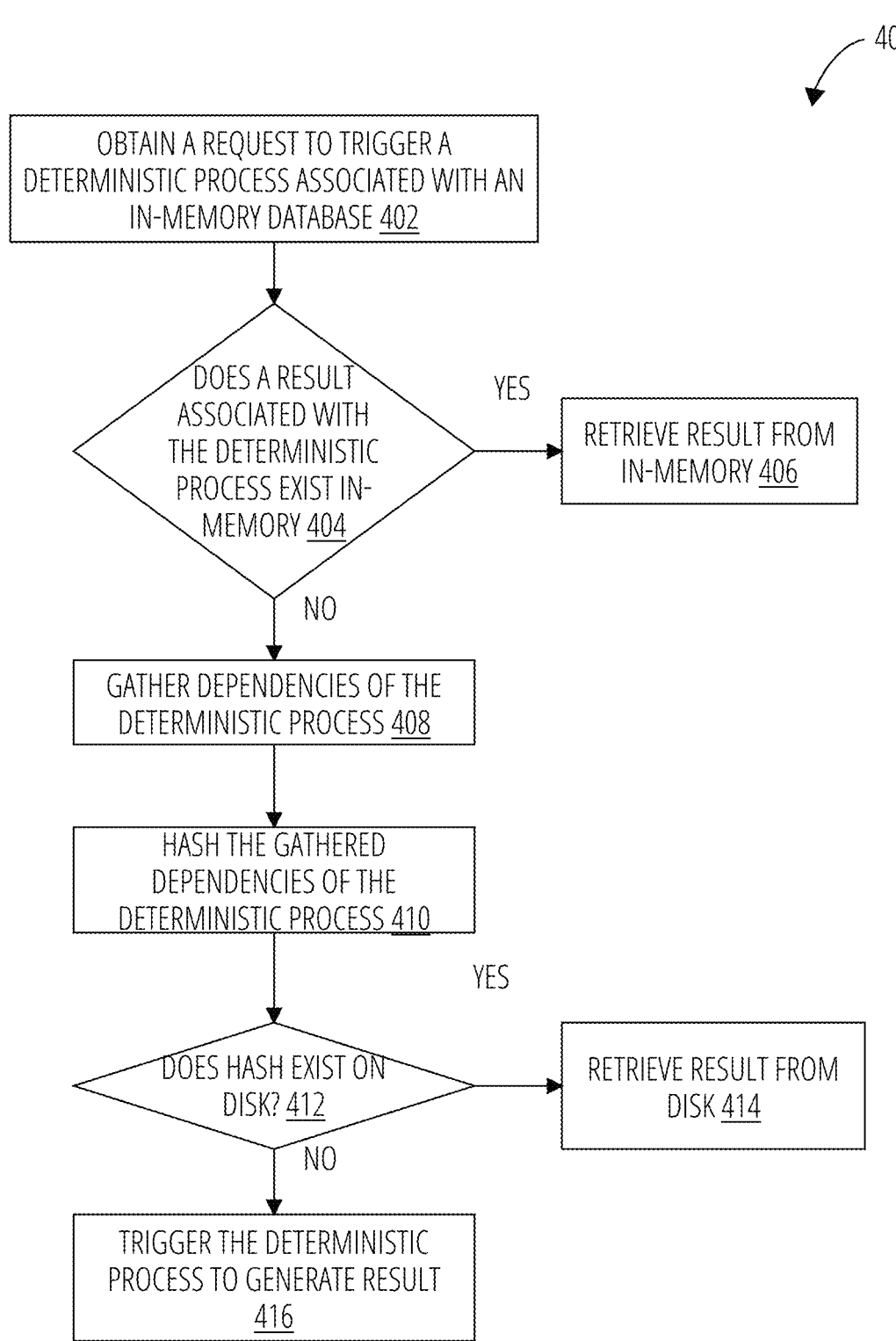
FIG. 4 illustrates a a block diagram of a method of process execution in accordance with one embodiment.

FIG. 4 illustrates a block diagram 400 of a method of process execution in accordance with one embodiment.

According to some examples, the method includes obtaining a request to trigger a deterministic process associated with an in-memory database at step 402. For example, the processor 106 illustrated in FIG. 1 may obtain a request to trigger deterministic process associated with an in-memory database. The deterministic process can be associated with an in-memory database comprising integrated analytics. The result of the deterministic process may be provided based on the process or algorithm itself, as well as its dependencies.

According to some examples, the method includes determining whether a result associated with the deterministic process exists in-memory, such as at decision block 404. For example, the processor 106 illustrated in FIG. 1 may determine whether the result exists in-memory.

According to some examples, in response to determining that the result associated with the deterministic process exists in-memory ('yes' at decision block 404), the method includes retrieving and returning the in-memory result at in-memory retrieval step 406. For example, the processor 106 illustrated in FIG. 1 may retrieve the in-memory result.

According to some examples, if the result associated with the deterministic process does not exist in-memory ('no' at decision block 404), the method includes gathering dependencies of the deterministic process, such as at block 408. For example, the processor 106 illustrated in FIG. 1 may gather dependencies of the deterministic process.

According to some examples, the method includes hashing the gathered dependencies of the deterministic process, such as at block 410. For example, the processor 106 illustrated in FIG. 1 may hash the gathered dependencies of the deterministic process.

According to some examples, the method includes determining whether the hash exists on disk, such as at decision block 412. For example, the processor 106 illustrated in FIG. 1 may determine whether the hash exists on disk.

According to some examples, in response to determining that the hash exists on disk. ('yes' at decision block 412), the method includes retrieving and returning the on-disk result at on-disk retrieval step 414. For example, the processor 106 illustrated in FIG. 1 may retrieve the on-disk result.

According to some examples, in response to determining that the hash of dependencies of the deterministic process does not exist on disk ('no' at decision block 412), the method includes triggering the deterministic process to generate results at block 416. For example, the processor 106 illustrated in FIG. 1 may trigger. the deterministic process.

Figure 5:
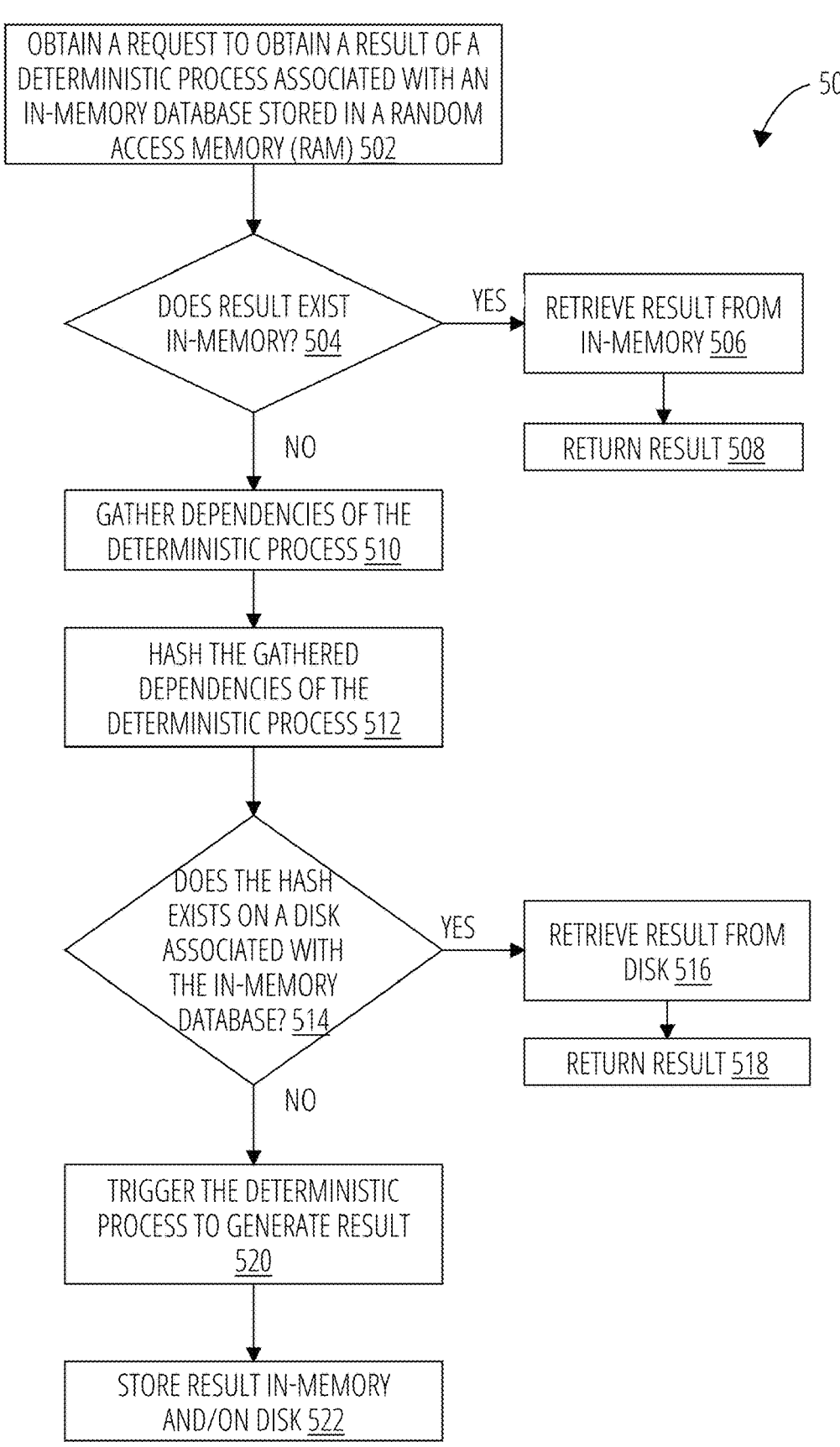
FIG. 5 illustrates a block diagram of a method of obtaining results of a deterministic process in accordance with one embodiment.

FIG. 5 illustrates a block diagram 500 of a method of obtaining results of a deterministic process in accordance with one embodiment.

According to some examples, the method includes obtaining a request to obtain a result of a deterministic process associated with an in-memory database stored in a random access memory (RAM). at block 502. For example, the processor 106 illustrated in FIG. 1 may obtain a request to obtain a result of a deterministic process associated with an in-memory database stored in a random access memory (RAM). The deterministic process can be associated with an in-memory database comprising integrated analytics. The result of the deterministic process may be provided based on the process or algorithm itself, as well as its dependencies.

According to some examples, the method includes determining whether a result associated with the deterministic process exists in-memory, such as at decision block 504. For example, the processor 106 illustrated in FIG. 1 may determine whether the result exists in-memory.

According to some examples, in response to determining that the result associated with the deterministic process exists in-memory ('yes' at decision block 504), the method includes retrieving and returning the in-memory result at in-memory retrieval step 506 and returning step 508. For example, the processor 106 illustrated in FIG. 1 may retrieve and return the in-memory result.

According to some examples, if the result associated with the deterministic process does not exist in-memory ('no' at decision block 504), the method includes gathering dependencies of the deterministic process, such as at block 510. For example, the processor 106 illustrated in FIG. 1 may gather dependencies of the deterministic process.

According to some examples, the method includes hashing the gathered dependencies of the deterministic process, such as at block 512. For example, the processor 106 illustrated in FIG. 1 may hash the gathered dependencies of the deterministic process.

According to some examples, the method includes determining whether the hash exists on disk, such as at decision block 514. For example, the processor 106 illustrated in FIG. 1 may determine whether the hash exists on disk.

According to some examples, in response to determining that the hash exists on disk. ('yes' at decision block 514), the method includes retrieving and returning the on-disk result at on-disk retrieval step 516 and return step 518. For example, the processor 106 illustrated in FIG. 1 may retrieve and return the on-disk result.

According to some examples, in response to determining that the hash of dependencies of the deterministic process does not exist on disk ('no' at decision block 514), the method includes triggering the deterministic process to generate results at block 520. For example, the processor 106 illustrated in FIG. 1 may trigger. the deterministic process.

According to some examples, subsequently, the result can be stored in-memory and/on disk at block 522. For example, the processor 106 illustrated in FIG. 1 may store in-memory and/on disk.

Figure 6:
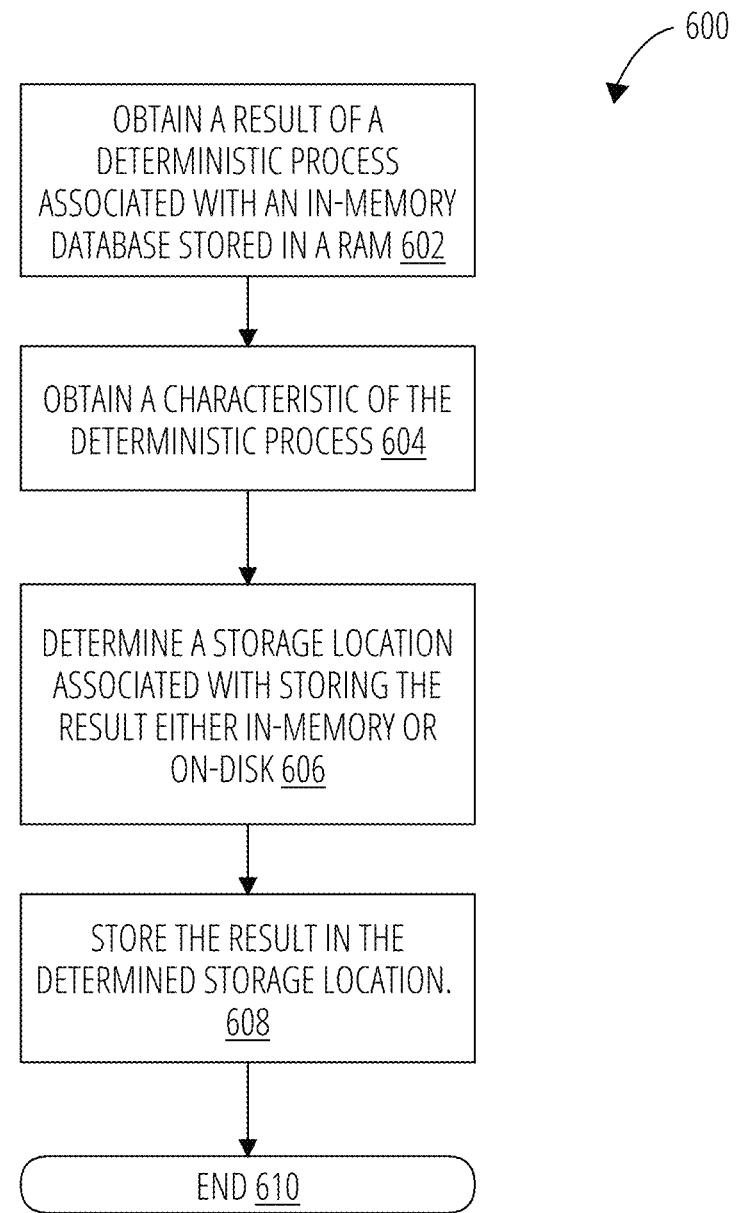
FIG. 6 illustrates a block diagram of a method of obtaining results of a deterministic process in accordance with one embodiment.

FIG. 6 illustrates a block diagram 600 of a method of obtaining results of a deterministic process in accordance with one embodiment.

According to some examples, the method includes obtaining a result of a deterministic process associated with an in-memory database stored in a random access memory (RAM) at block 602. For example, the processor 106 illustrated in FIG. 1 may obtain a result of a deterministic process associated with an in-memory database stored in a random access memory (RAM). The deterministic process can be associated with an in-memory database comprising integrated analytics. The result of the deterministic process may be provided based on the process or algorithm itself, as well as its dependencies.

According to some examples, the method further includes obtaining a characteristic of the deterministic process at block 604. For example, the processor 106 illustrated in FIG. 1 may obtain a a characteristic of the deterministic process.

According to some examples, the method includes storing the result in the determined storage location, at block 608. For example, the processor 106 illustrated in FIG. 1 may store the result in the determined storage location. The computer-implemented method may also include determining the storage location as being on-disk when the deterministic process is an embedded algorithm, such as a Type-Script algorithm. The process ends at 610.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computing apparatus, comprising:
a processor; and
a memory storing instructions that, when executed by the processor, configure the apparatus to:
obtain a request to trigger a deterministic process associated with an in-memory database stored in a random access memory;
determine that a result associated with the deterministic process does not exist in-memory;
in response to the determination that the result does not exist in-memory:
gather dependencies of the deterministic process; and
generate a hash for the gathered dependencies of the deterministic process;
determine whether the hash exists on a disk associated with the in-memory database;
where the hash exists on the disk:
retrieve the results from disk; and
where the hash does not exist on the disk:
trigger the deterministic process to generate results.

2. The computing apparatus of claim 1, wherein the memory stores instructions that, when executed by the processor, further configure the apparatus to:
store the generated results in-memory and/or on-disk: and
return the generated results,
where the hash does not exist on the disk.

3. The computing apparatus of claim 1, wherein the deterministic process is associated with the in-memory database comprising integrated analytics.

4. The computing apparatus of claim 1, wherein the deterministic process is associated with the in-memory database comprising a supply chain algorithm.

5. The computing apparatus of claim 1, wherein the deterministic process is associated with an in-memory versioned database.

6. The computing apparatus of claim 1, wherein the deterministic process comprises an embedded algorithm.

7. A non-transitory computer-readable storage medium, the computer-readable storage medium including instructions that, when executed by a computer, cause the computer to:

obtain, by a processor, a request to trigger a deterministic process associated with an in-memory database stored in a random access memory;

determine that a result associated with the deterministic process does not exist in-memory;

in response to the determination that the result does not exist in-memory:

gather dependencies of the deterministic process; and generate a hash for the gathered dependencies of the deterministic process;

determine whether the hash exists on a disk associated with the in-memory database;

where the hash exists on the disk:

retrieve, by the processor, the results from disk; and where the hash does not exist on the disk:

trigger the deterministic process to generate results.

8. The non-transitory computer-readable storage medium of claim 7, further comprising instructions that, when executed by the processor, cause the computer to:

store the generated results in-memory and/or on-disk: and return the generated results, where the hash does not exist on the disk.

9. The non-transitory computer-readable storage medium of claim 7, wherein the deterministic process is associated with the in-memory database comprising integrated analytics.

10. The non-transitory computer-readable storage medium of claim 7, wherein the deterministic process is associated with the in-memory database comprising a supply chain algorithm.

11. The non-transitory computer-readable storage medium of claim 7, wherein the deterministic process is associated with an in-memory versioned database.

12. The non-transitory computer-readable storage medium of claim 7, wherein the deterministic process comprises an embedded algorithm.

13. A computer-implemented method of process execution, comprising:

obtaining, by a processor, a request to trigger a deterministic process associated with an in-memory database stored in a random access memory;

determining, by the processor, that a result associated with the deterministic process does not exist in-memory;

in response to the determination that the result does not exist in-memory:

gathering, by the processor, one or more dependencies of the deterministic process; and generating, by the processor, a hash for the one or more dependencies of the deterministic process;

determining, by the processor, whether the hash exists on a disk associated with the in-memory database;

where the hash exists on the disk:

retrieving, by the processor, the results from disk; and where the hash does not exist on the disk:

triggering, by the processor, the deterministic process to generate results.

14. The computer-implemented method of claim 13, further comprising:

storing, by the processor, the generated results in-memory and/or on-disk: and returning, by the processor, the generated results, where the hash does not exist on the disk.

15. The computer-implemented method of claim 13, wherein the deterministic process is associated with the in-memory database comprising a supply chain algorithm.

16. The computer-implemented method of claim 13, wherein the deterministic process is associated with the in-memory database comprising supply chain algorithms.

17. The computer-implemented method of claim 13, wherein the deterministic process is associated with an in-memory versioned database.

18. The computer-implemented method of claim 13, wherein the deterministic process comprises an embedded algorithm.

\* \* \* \* \*